Aug. 11, 1959   E. H. SILLS   2,899,616
ADJUSTABLE VOLTAGE CONTROL SYSTEM
Filed April 28, 1958

Inventor:
Earl H. Sills,
by Irving H. Marshman
His Attorney.

United States Patent Office 2,899,616
Patented Aug. 11, 1959

2,899,616

ADJUSTABLE VOLTAGE CONTROL SYSTEM

Earl H. Sills, Roanoke, Va., assignor to General Electric Company, a corporation of New York Application April 28, 1958, Serial No. 731,203

9 Claims. (Cl. 318—145)

This invention relates to control systems, more particularly to control systems for adjustable speed drives, and it has for an object the provision of a simple, reliable, inexpensive and improved control system of this character.

More specifically, the invention relates to control systems for adjustable voltage drives in which a D.-C. motor is supplied from an adjustable voltage generator, and a further object of the invention is to simplify and to reduce the cost of the field control of the generator and the motor supplied therefrom. The conventional control system for providing both generator and motor field control for this type of drive embodies a special dial switch or compound rheostat having one rheostat connnected in the generator field circuit and a separate rheostat connected in the motor field circuit. With the rheostat dial in the minimum speed position the resistance of the generator field rheostat is all cut in and the resistance of the motor field rheostat is all cut out. As the dial is moved toward the high speed end, resistance is cut out of the generator field. When the generator resistance has all been cut out, further movement of the dial begins to cut in the motor field resistor. At the high speed end the generator field resistor is all cut out and the motor field resistor is all cut in. This system of field control requires special rheostat plates, and the number is excessively large if used to control a large motor and generator. Accordingly, a further object of this invention is the provision of an adjustable voltage control system in which a single rheostat serves to provide generator field strengthening throughout a continuous range of values and subsequent motor field weakening throughout a continuous range of values.

In carrying the invention into effect in one form thereof, the generator field and motor field are connected in parallel branch circuits between one of a pair of excitation supply conductors and a common terminal with a single rheostat included in the generator field branch. A common connection is provided between this common terminal and the other excitation supply conductor, together with a resistor and means responsive to adjustment of the rheostat to a predetermined low value to prepare for including the resistor in the common connection to provide for weakening the motor field and recalibrating the generator field rheostat.

Figure 1:
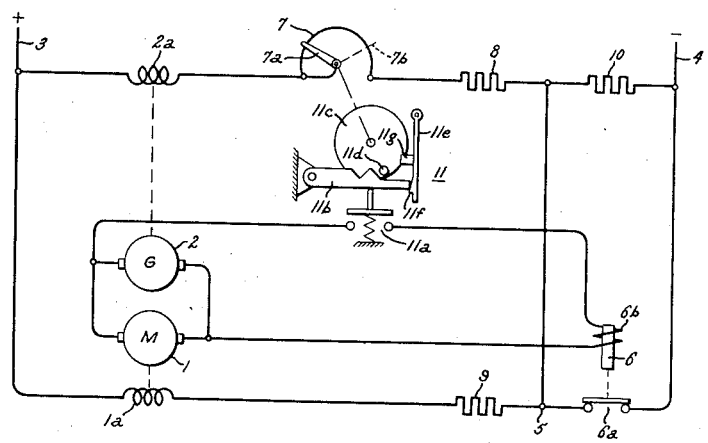
Figure 2:
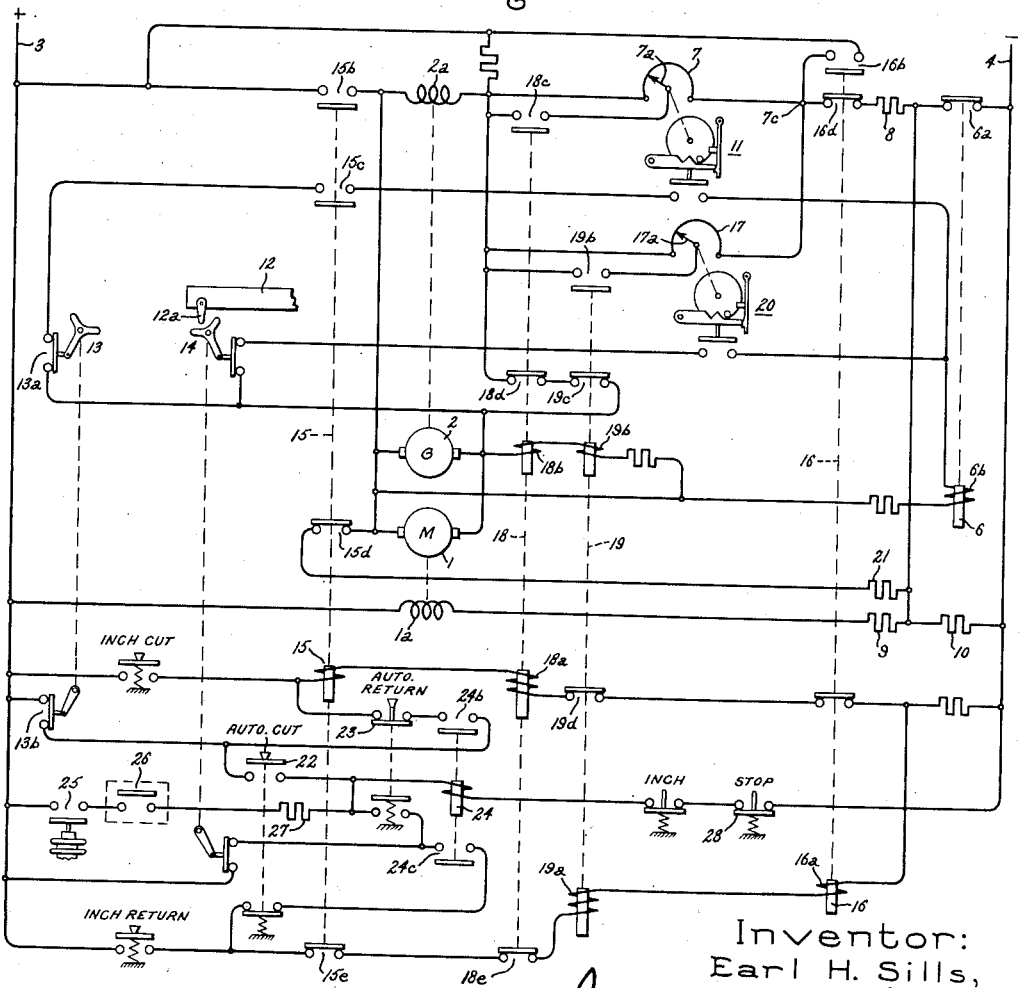

For a better and more complete understanding of the invention reference should now be had to the following specification and to the accompanying drawings of which:

Fig. 1 is a simplified diagrammatical sketch of an embodiment of the invention, and Fig. 2 is a simple elementary diagram of another embodiment of the invention in a control system which is adapted for controlling an adjustable voltage drive for a reciprocating load such for example as a planer.

Referring now to the drawing, a D.-C. motor 1 is supplied from an adjustable voltage generator 2 which is driven at a speed which is preferably substantially constant by any suitable driving means such for example as a squirrel cage induction motor (not shown). The generator and motor are provided with separately excited field windings 2a and 1a respectively which are supplied from a suitable source of excitation such as the positive and negative supply conductors 3 and 4. As shown, these field windings are connected in parallel branch circuits from the positive supply conductor 3 to a common terminal 5 which is connected through the normally closed contacts 6a of a contactor 6 to the negative supply conductor 4. Included in series relationship in the connection between the generator field winding and the common terminal 5 is a rheostat 7 and a fixed resistor 8. The rheostat 7 may have a number of plates which number is dependent upon the size of the generator. A fixed resistor 9 is included in the motor field branch between the field winding 1a and the common terminal 5. The resistors 8 and 9 serve to reduce the time constants of the generator and motor field circuits.

In parallel with the normally closed contacts 6a of the contactor 6 is connected a resistor 10. When the contactor 6 is deenergized, the contacts 6a are closed and the resistor 10 is short circuited. Conversely, when the contactor 6 is energized and picked up, the contacts 6a are open and resistor 10 is inserted in the common connection between the common terminal 5 and the negative supply conductor 4. Resistor 10 performs the dual function of weakening the motor field and recalibrating the generator field rheostat 7. Since the contactor 6 controls this resistor, it is known as the field-weakening contactor.

Mounted on the field generator rheostat 7 in such a manner that its position may be adjusted, is an interlock 11 having contacts 11a which are included in the energizing circuit for the operating coil 6b of the field-weakening contactor 6. This energizing circuit is connected across the armature terminals of the adjustable voltage generator. The rheostat is designed so that full generator voltage is obtained when the slider 7a is at the point 7b, and the contacts 6a are open. Although this interlock device can be of any suitable type, it is illustrated as a pushbutton switch having normally open contacts 11a, a pivoted contact operator 11b, a disk 11c fixedly mounted on the shaft of the rheostat so as to rotate therewith, and carrying a pin 11d for actuating the contact operator. The spring 11e is provided with a latch 11f and an unlatch 11g. As the disk 11c turns in a clockwise direction the pin 11d actuates the contact operator 11b to close the pushbutton switch contacts 11a. The latch 11f on the spring holds the operator against the pushbutton as the rotation of the disk 11c proceeds beyond the operating point. Rotation of the disk 11c in the counterclockwise direction causes the pin to actuate the unlatch 11g to permit the operator 11b to reset.

Briefly the operation is as follows. By adjusting the rheostat slider 11a between the maximum resistance position and the point 7b, the motor 1 can be operated at any speed between standstill or minimum and base speed. The slider may be adjusted to any point within the range of high resistance values between its left hand end and point 7b, and the motor 1 will operate at a speed related to the position of the slider. When the slider reaches the point 7b, the electrical interlock 11 is actuated to close its contacts 11a to complete the energizing circuit for the operating coil 6a of the field-weakening contactor. In response to a predetermined value of generator voltage which may be somewhat less than the value which produces base speed of the motor 1, the field-weakening contactor 6 picks up and opens its contacts to insert the fixed resistor 10 in the common connection of the motor and generator field circuits between the common terminal 5 and the negative supply conductor 4. This weakens the field of the motor which tends to increase its speed, but it also recalibrates the rheostat and reduces the generator field strength and voltage which tends to reduce the motor speed. The net result is that there is no appreciable change in speed at the point at which the interlock 11 is operated. As the slider 7a of the rheostat is moved beyond point 7b in the resistance-decreasing direction, the generator field current is increased, and at the same time the motor field current is further weakened owing to the increased load across resistor 10. This generator field strengthening and motor field weakening process continues until the rheostat has all been cut out. At this point the generator produces full voltage and the motor field is sufficiently weakened owing to the increased voltage drop across resistor 10 to cause the motor to operate at maximum speed.

This control system has the advantage of weakening the motor field progressively as the generator field is strengthened after basic speed is reached. This provides the maximum possible accelerating torque for a given speed setting of the rheostat. The generator field is also forced or over-excited during the accelerating period when operating in that portion of the speed range in which the motor field is weakened. Another advantage of this control system is that the generator can be operated above the knee of the saturation curve so that no further generator field strengthening is produced in the motor field-weakening portion of the speed range. Thus it is possible to approximate the same characteristic as that obtained with a compound rheostat if this is desired.

Although the invention is not limited to any particular values of voltages or resistances, the values in the following tabulation will provide highly satisfactory operation:

*Voltages*

| | |
|---|---|
| Excitation buses 3 and 4 | 250 |
| Generator voltage (full) | 250 |

*Resistances*

| Resistors: | Ohms |
|---|---|
| 8 | 9 |
| 9 | 26 |
| 10 | 8.2 |
| Motor field winding 1a | 25.6 |
| Generator field winding 2a | 5.4 |

In Fig. 2 the invention is illustrated as embodied in a control system for an adjustable speed drive such as would be appropriate for a reversing load, e.g. a planer. The platen 12 of the planer is driven by the motor 1 through suitable reduction gearing (not shown) in a reciprocating motion between limit switches 13 and 14. A switching device such as a contactor 15 when picked up connects the generator field winding 2a to the source of excitation 3, 4 for excitation in the "cut" direction and contactors 16 performs a similar function for the "return" direction. The excitation supply conductors may be energized from any suitable source such for example as an exciter dynamoelectric machine driven by a substantially constant speed motor (not shown). The speed of the motor 1 in the cut direction is controlled by the rheostat 7 with a maximum speed being determined by the setting of the slider 7a. A similar rheostat 17 is provided for controlling the return speed.

Means, illustrated as a pair of electromagnetic switching devices such as relays 18 and 19, are provided for selectively short circuiting portions of the cut and return rheostats 7 and 17 respectively thereby to render the unshortcircuited portion of each active as a current limiting device in the generator field circuit. Each of these relays short circuits the portion of its corresponding rheostat between the sliding contact thereof and the generator field winding. When the relay 18 is picked up, that portion of the cut rheostat 7 between the slider 7a and terminal 7c is active in the generator field circuit during the cut stroke. Similarly during the return stroke the portion between the slider 17a and 7c is active as a current limiting device in the generator field circuit. In other words, the slider 7a adjusts the cut speed and the slider 17a adjusts the return speed.

These relays 18 and 19 are provided with main operating coils 18a and 19a respectively and with auxiliary coils 18b and 19b respectively. The main coils are energized from the constant voltage excitation source 3, 4, and the auxiliary coils are connected across the generator terminals so as to be energized by the generator voltage. The pulls of the auxiliary coils are insufficient to attract their armatures to close their contacts, but once these contacts are closed by their main operating coils the auxiliary coils will maintain them closed even though the main operating coils be subsequently deenergized until the generator voltage decays to a predetermined low value. When the generator voltage decays to such predetermined value, whichever of the relays 18 or 19 that immediately prior to this instant was picked up will be dropped out to permit the other and its corresponding directional contactor 15 or 16 to pick up and reverse the generator field. Thus the relays 18 and 19 also serve as anti-plugging contactors but are known by the more simple term plugging contactors.

The return rheostat 17 is provided with an interlock 20 which is similar to the interlock 11 on the cut rheostat. For the cut and return motions the interlocks 11 and 20 respectively perform the same functions as those described for the interlock 11 in Fig. 1.

For the purposes of providing a discharge path for the generator field, the cut and return directional contactors 15 and 16 are provided with auxiliary normally closed contacts 15d and 16d respectively which, when both directional contactors are open, complete a circuit for the field winding through a portion of the active rheostat and the resistors 8 and 21.

Spring-return pushbutton switches 22 and 23 control the energization of a relay 24 known as the "automatic" relay for initiating automatic operation. If switch 22 is momentarily depressed, relay 24 picks up and starts the planer in the cut direction whereupon automatic operation ensues between limit switches 13 and 14. Consequently switch 22 which initiates this operation is known as the automatic cut pushbutton. Similarly, if switch 23 is momentarily depressed the automatic relay is similarly picked up but automatic operation in the return direction ensues. For this reason switch 23 is known as the "automatic return" pushbutton.

With the foregoing understanding of the elements and their organization, the operation of the system itself will readily be understood from the following detailed description. As an initial operating condition it is assumed that the automatic relay 24 is dropped out and that the planer is at rest with the platen 12 in any intermediate position so that its dog 12a is in a position between the limit switches 13 and 14. It may also be assumed that the desired cut and return speeds are within the motor field weakening range, and thus the sliders 7a and 17a are moved to positions beyond the predetermined position at which the rheostat interlock contacts 11 and 20 are closed.

To start the planer in the cut direction the automatic cut pushbutton 22 is depressed to complete an energizing circuit for the automatic relay 24 through normally closed contacts 13b of the cut limit switch 13. Relay 24 picks up and seals itself in through the series combination of the contacts of a pressure switch 25, interlocks 26 of a blower motor and a resistor 27. The resistor 27 permits sufficient current to flow to maintain relay 24 picked up but does not permit sufficient current to flow to pick it up prior to the closing of the automatic cut switch 22. In its picked up position, relay 24 closes its normally open contacts 24b and 24c. In closing, contacts 24b complete an energizing circuit for the operating coils of the cut contactor 15 and the cut direction plugging relay 18. Relay 18 closes its contacts 18c to short circuit the portion of the cut rheostat 7 between the generator field terminal and the slider 7a.

Responsively to energization, the cut relay picks up and opens its normally closed contacts 15d and 15e and closes its normally open contacts 15b and 15c. Contacts 15b complete the generator field circuit through the cut rheostat 7, normally closed contacts 16d of the return contactor, resistor 8 and normally closed contacts 6a of the field-weakening contactor to the negative supply conductor 4. As a result the generator field current begins to increase and the generator voltage and motor speed increase correspondingly. At a predetermined value of generator voltage, the motor field weakening contactor 6 responds and picks up to open its normally closed contacts 6a thereby to insert the resistor 10 in the motor and generator field circuits. This initiates weakening both the motor and generator fields. The weakening of the motor field tends to increase the motor speed but this is counteracted for a brief instant by the reduced generator voltage which tends to decrease the motor speed. As the generator field current thereafter continues to increase to its final value, the motor field continues to weaken as a result of the insertion of the resistor 10 in the common connection and the increasing voltage drop across it as the generator field current rises to its final value. The higher the speed setting of the slider 7a within the motor field weakening range, the greater will be the final value of current through the field-weakening resistor and likewise the greater will be the voltage drop across it. Similarly, the greater the final value of the voltage drop across the field-weakening resistor the lower will be the motor field current. The exact value of generator voltage for which the field-weakening relay 6 is designed to pick up will depend upon the time constants of the generator field and motor field circuits. Assuming full generator voltage to be 250 volts and further assuming a time constant of one-fourth second for the generator field circuit and between one-half and three-fourths second for the motor field circuit, the transition from the full motor field range to the motor field weakening range will take place smoothly if the field-weakening relay is designed to pick up at approximately 50% of full generator voltage, i.e. 120–125 volts.

As the platen 12 arrives at the end of the cut stroke, the dog 12a engages the cut limit switch 13 and opens its contacts 13a in the energizing circuit of the field-weakening contactor and its contacts 13b in the circuit of the cut contactor 15 and cut direction plugging relay 18. In response to deenergization, the field-weakening contactor 6 drops out and closes its normally open contacts 6a to short circuit the field-weakening resistor 10. This weakens the field of the motor but strengthens the field of the generator so that the net result at this point is substantially no change in motor speed. Contacts 15b, in opening, interrupt the supply of excitation to the generator field, and contacts 15c, in opening, further interrupt the energizing circuit of the field-weakening contactor. Contacts 15d complete a discharge circuit for the generator field winding through resistors 21 and 8, contacts 16d and the active portion of rheostat 7. The resulting rapid decay of the generator voltage combined with the strengthening of the motor field affects a rapid decrease of the motor speed. Contacts 15e, in their closed position, partially complete an energizing circuit for the operating coils 19a of the return direction plugging relay and 16a of the return contactor. However this energizing circuit remains open at the contacts 18e of the cut direction plugging relay which, owing to the energization of the auxiliary coil 18b by the generator voltage does not drop out immediately in response to opening of the cut limit switch but remains picked up until the generator voltage decreases to a predetermined value. At such predetermined value, which may be approximately half full rated voltage, the cut direction plugging relay drops out and opens its contacts 18c and closes its contacts 18d and 18e. Contacts 18d complete a "suicide" connection of the generator field and armature which forces the generator field rapidly to zero and therefore produces a vigorous regenerative braking action of the motor. Contacts 18e, in closing, complete an energizing circuit for the operating coils 19a of the return direction plugging contactor and 16a of the return contactor.

In response to energization, the plugging contactor 19 picks up and opens its contacts 19c to interrupt the suicide circuit, and closes its contacts 19b to short circuit the portion of the return rheostat 17 between the generator field terminal and the slider 17a. Simultaneously, the return contactor 16 picks up and closes its contacts 16b to connect the generator field winding to the excitation supply conductors 3 and 4 for excitation of reverse polarity. This reverses the polarity of the generator voltage and affects acceleration of the motor in the return direction. As the platen 12 is driven out of the limit switch zone in the return direction, the cut limit switch is again actuated to the contact-closed position. The operation described for the cut direction is now repeated for the return direction to complete a cycle which is repeated until the stop pushbutton switch 28 is depressed to interrupt the energizing circuit of the automatic relay 24. In response to deenergization, the automatic relay drops out and opens its contacts 24b and 24c to interrupt the energizing circuits for the cut and return contactors, and the motor 1 is regeneratively braked to rest in the manner described for the reversal operation at the end of the cut stroke.

Since within the motor field weakening range, the motor field current varies inversely with the speed setting positions of the sliders 7a and 17a of the cut and return rheostats, the cut and return speeds are adjustable over the entire armature and field range.

Although in accordance with the provisions of the patent statutes, a specific embodiment of the invention has been completely described together with the best mode in which it is now contemplated carrying the invention into effect, it will be understood that the apparatus shown and described is merely illustrative, and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. A control system comprising a pair of excitation supply conductors, an adjustable voltage generator having a field winding, a motor supplied from said generator and having a field winding, electrical connections between one of said supply conductors and one terminal of each of said windings, a common terminal, a common connection between the other of said supply conductors and said common terminal, electrical connections between said common terminal and the other terminals of said windings, an adjustable resistance in series with said generator field, a common resistor, and means responsive to a predetermined adjustment of said adjustable resistance in the generator field strengthening direction to provide for inserting said common resistor in said common connection.

2. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, an adjustable resistance in said generator field connections, a resistor, and means responsive to decrease of said adjustable resistance to a predetermined value to prepare for inserting said resistor in said common connection.

3. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, an adjustable resistance in said generator field connections, a resistor, and means responsive to decrease of said adjustable resistance to a predetermined value to prepare for inserting said resistor in said common connection to provide for strengthening the field of said generator and correspondingly weakening the field of said motor in response to further decrease of said adjustable resistance.

4. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, an adjustable resistance in said generator field connections, a resistor, and means responsive to a predetermined range of values of said resistance for excluding said resistor from said common connection to provide for varying the field strength of said generator and maintaining constant the field strength of said motor in response to variation of said resistance within said range and responsive to a predetermined lower range of values of said resistance to prepare for including said resistor in said common connection to provide for inversely varying the field strengths of said generator and motor in response to variation of said resistance within said lower range.

5. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, a rheostat included in said generator field connections and having a movable resistance controlling member, a resistor and interlock means responsive to movement of said movable member in the resistance decreasing direction to a predetermined point to prepare for inserting said resistor in said common connection to provide for inversely varying the field strengths of said generator and motor.

6. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, a rheostat included in said generator field connection and having a movable contact, a resistor and interlock means controlled by said movable contact for excluding said resistor from said common connections for positions of said movable contact within a range of relatively high resistance values to provide for varying the field strength only of said generator in response to movement of said contact within said range, and for preparing to include said resistor in said common connection for positions of said movable contact within a range of relatively low values of said resistance to provide for inversely varying the field strengths of said generator and motor in response to variation of said resistor within said low value range.

7. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, a rheostat in said generator field connections, a resistor, and switching means jointly responsive to adjustment of said rheostat to a predetermined low resistance value and to a predetermined value of generator voltage for inserting said resistor in said common connection.

8. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, a rheostat in said generator field connections, a resistor, and means for inserting said resistor in said common connection comprising an interlock actuated in response to adjustment of said rheostat to a predetremined low resistance value and a switching device jointly responsive to said interlock and to a predetermined value of voltage of said generator.

9. A control system comprising a pair of excitation supply conductors, an adjustable voltage generator having a field winding, a motor supplied from said generator and having a field winding, a common terminal, a common connection from said common terminal to one of said supply conductors, electrical connections from said field windings to the other of said supply conductors and to said common terminal, a rheostat in said generator field connections, a resistor and means for excluding said resistor from said common connection for adjustments of said rheostat within a predetermined range of relatively high resistance values and for including said resistor in said common connection for adjustments of said rheostat within an adjoining range of relatively low resistance values and generator voltages above a predetermined value comprising an interlock at the boundary of said high resistance and low resistance ranges actuated by the movable contact of said rheostat and switching means jointly responsive to actuation of said interlock and to said predetermined value of generator voltage.

No references cited.